Feb. 3, 1925.
E. D. TREANOR
1,524,762
ELECTRICAL INDUCTION APPARATUS
Filed May 5, 1922
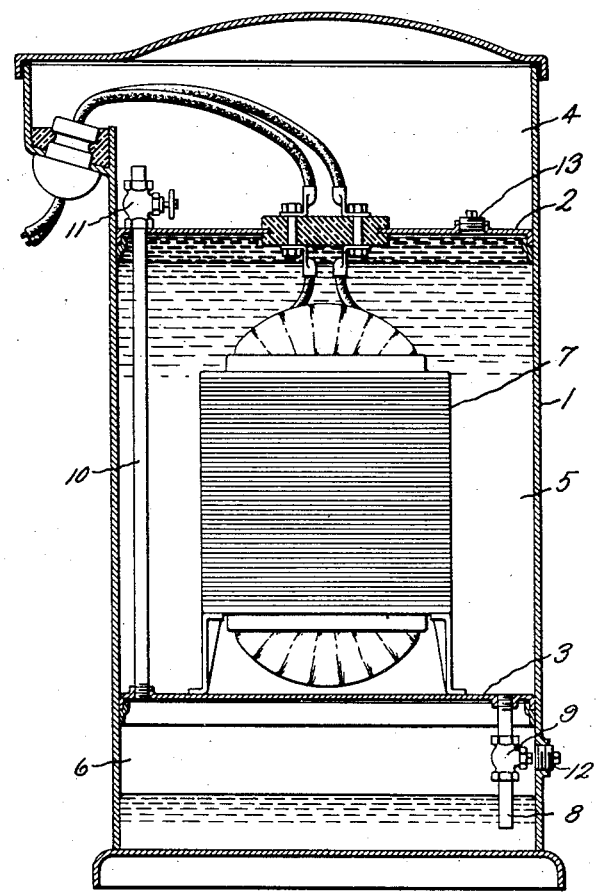
Inventor:
Edward D. Treanor,
by Albert E. Davis
His Attorney.

Patented Feb. 3, 1925.

1,524,762

UNITED STATES PATENT OFFICE.

EDWARD D. TREANOR, OF PITTSFIELD, MASSACHUSETTS, ASSIGNOR TO GENERAL ELECTRIC COMPANY, A CORPORATION OF NEW YORK.

ELECTRICAL INDUCTION APPARATUS.

Application filed May 5, 1922. Serial No. 558,828.

*To all whom it may concern:*

Be it known that I, EDWARD D. TREANOR, a citizen of the United States, residing at Pittsfield, in the county of Berkshire, State of Massachusetts, have invented certain new and useful Improvements in Electrical Induction Apparatus, of which the following is a specification.

My invention relates to electrical induction apparatus which is cooled by immersion in a cooling and insulating liquid, such as oil, contained in a surrounding casing.

It is customary to cool and insulate electrical induction apparatus, such as transformers, by immersion in a cooling and insulating liquid contained in a surrounding casing. The liquid surrounding the apparatus becomes heated during operation of the apparatus and its insulating properties would very probably be impaired by oxidation or absorption of moisture if it were to come into contact with air. This is commonly prevented by filling the apparatus compartment with liquid to exclude all air, the expansion and contraction of the liquid due to varying temperature taking place through a passage leading to a separate partially filled expansion chamber provided for this purpose. The general object of the invention is to provide an improved casing with an expansion chamber for electrical apparatus immersed in a cooling and insulating liquid.

The advantages of the invention will appear from the following description of one embodiment thereof taken in connection with the accompanying drawing which shows a transformer enclosed in a casing constructed in accordance with the invention, the casing being shown in section to reveal its construction.

In this particular embodiment of the invention, a casing 1 is divided by two diaphragms or partitions 2 and 3 into an upper compartment 4, a central compartment 5 and a lower compartment 6. The central compartment 5 contains a piece of electrical apparatus shown here as a tranformer 7. This central or transformer compartment 5 communicates with the lower compartment 6 through a pipe 8 provided with a valve 9 and the lower compartment 6 preferably communicates with the upper compartment 4 through another pipe 10 provided with a valve 11. Access to the valve 9 may be had through a hole normally closed by a plug 12 in the casing 1. With the valve 11 closed and the valve 9 open, the compartment 5 containing the transformer may be filled with oil or other insulating and cooling liquid through an opening in the upper diaphragm 2, which opening is then closed by the plug 13, enough liquid having passed through the pipe 8 into the lower compartment 6 to create air pressure in this compartment sufficient to balance the pressure of the liquid in the central compartment 5. The pipe 8 should extend well down into the lower compartment 6 so that its lower end will be below the surface of the liquid in this compartment at all times. Expansion and contraction of the liquid in the central or transformer compartment 5 is cared for by an interchange of liquid through the opening 8 between this compartment and the lower expansion compartment 6, the elasticity of the air in the expansion compartment and in the pipe 10 permitting the variations in the quantity of liquid in this compartment. An inert gas, such as nitrogen may be used, if desired, in the expansion compartment instead of air. It will be noted that liquid transferred by expansion from the transformer compartment to the expansion compartment is always from the lower portion of the transformer compartment and therefore always cool so that only cool liquid is exposed to the air in the expansion compartment. Liquid heated by the transformer during its operation rises by convection to the upper part of the transformer compartment 5 where there is no air to cause possible contamination. Leakage of air into the transformer compartment 5 may be prevented by sufficient gas pressure in the expansion compartment 6. This gas pressure may be of such value that in case of a leak in the upper diaphragm 2 there would be a flow of liquid out of the transformer compartment rather than of air into this compartment.

Another method of operation may be sometimes desirable. With the valves 11 and 9 open, liquid may be supplied through the compartment 5 and the opening 8 into the expansion compartment 6 until its level in the expansion compartment is above the lower end of the opening 8. The valve 9 may then be closed, the transformer compartment filled with liquid, the upper diaphragm 2 sealed with the plug 13 and the valve 9 then reopened. Atmospheric pressure on the surface of the liquid in the expansion compartment 6 will keep the transformer compartment 5 full of liquid. As the level of the liquid in the expansion compartment 6 varies under the influence of expansion and contraction in the transformer compartment 5, air will pass to and fro between the upper or air compartment 4 and the expansion compartment 6. In the preferred embodiment of the invention which has been described, the air which is drawn into contact with the liquid in the expansion compartment 6, therefore always comes from the upper or air compartment where it is heated by the warm oil under the upper diaphragm and therefore is usually drier than the outside air surrounding the casing. This air, furthermore, can come into contact only with cool liquid and any moisture which it may bring to this cool liquid will settle to the bottom of the expansion compartment where it can do no harm. It is obvious that with either method of operation, no precaution need be taken to make the cover of the casing 1 above the upper or air compartment tight.

The invention provides a construction which is simple, compact and efficient and in which the use of external attachments may be substantially avoided.

What I claim as new and desire to secure by Letters Patent of the United States, is:—

1. A casing for electrical apparatus, said casing having a compartment for the apparatus and an expansion compartment below said apparatus compartment, means providing communication between said compartments, an insulating liquid within the apparatus compartment and extending into and partially filling the expansion compartment, a pipe extending from the expansion compartment to a point above the upper part of the apparatus compartment, and means for opening and closing said pipe.

2. A casing for electrical apparatus, said casing having three vertically disposed compartments, there being communication between the central and lower compartments and between the lower and upper compartments, and an insulating liquid within said central compartment and extending into said lower compartment.

3. A casing for electrical apparatus, said casing having three vertically disposed compartments, there being communication between the central and lower compartments and between the lower and upper compartments, and an insulating liquid within said central compartment and in which the apparatus is immersed, said liquid extending into and partially filling said lower compartment.

4. A casing for electrical apparatus, said casing having three vertically disposed compartments, there being communication between the central and lower compartments and between the lower and upper compartments, an insulating liquid within said central compartment and in which the apparatus is immersed, said liquid extending into and partially filling said lower compartment, and means for closing communication between said lower and upper compartments.

5. In combination with electrical apparatus, means constructed to provide three compartments, and an insulating liquid within one of said compartments and in which said apparatus is immersed, another of said compartments being partially filled with insulating liquid in communication with the liquid in said apparatus compartment, and the space above the liquid in said partially filled compartment being in communication with the third compartment.

6. In combination with electrical apparatus, means constructed to provide three compartments, and an insulating liquid within one of said compartments and in which said apparatus is immersed, another of said compartments being partially filled with insulating liquid in communication with the liquid in said apparatus compartment, the space above the liquid in said partially filled compartment being in communication with the third compartment, and said third compartment being arranged to be warmed by heat generated by said apparatus.

In witness whereof, I have hereunto set my hand this 3rd day of May, 1922.

EDWARD D. TREANOR.